(12) United States Patent
Oksanen et al.

(10) Patent No.: US 6,787,492 B2
(45) Date of Patent: Sep. 7, 2004

(54) FILTER CLOTH

(75) Inventors: Esa Oksanen, Tampere (FI); Aarne-Matti Heikkilä, Tampere (FI)

(73) Assignee: Tamfelt Oyj ABP, Tampere (FI)

( * ) Notice: Subject to any disclaimer, the term of this patent is extended or adjusted under 35 U.S.C. 154(b) by 253 days.

(21) Appl. No.: 09/930,173

(22) Filed: Aug. 16, 2001

(65) Prior Publication Data

US 2002/0127935 A1 Sep. 12, 2002

Related U.S. Application Data

(63) Continuation of application No. PCT/FI00/00105, filed on Feb. 14, 2000.

(30) Foreign Application Priority Data

Feb. 17, 1999 (FI) .................................................. 990334

(51) Int. Cl.$^7$ .................................................. B32B 5/26
(52) U.S. Cl. ..................... 442/268; 442/270; 442/271; 428/218; 210/500.1; 210/503; 210/505
(58) Field of Search ................................ 442/247, 181, 442/134, 136, 268, 270, 271; 210/500.1, 490, 491, 503, 505, 507, 508, 400; 428/218

(56) References Cited

U.S. PATENT DOCUMENTS 4,529,643 A   7/1985  Lundström .................. 442/275
4,726,978 A * 2/1988  Simpson ..................... 428/198
6,169,045 B1 * 1/2001 Pike et al. .................. 442/352

FOREIGN PATENT DOCUMENTS

| DE | 4111973 | 6/1992 |
| DE | 19526458 | 1/1997 |
| EP | 0 641 588 | 3/1995 |
| EP | 0 741 815 | 11/1996 |
| FI | 64959 | 10/1983 |
| FI | 990334 | 3/2000 |
| JP | 61 162 299 | 7/1986 |
| SU | 1724321 | 4/1992 |

* cited by examiner

Primary Examiner—Ula C. Ruddock
(74) Attorney, Agent, or Firm—McDermott Will & Emery LLP

(57) ABSTRACT

The invention relates to a filter cloth intended for a filter which has a variable volume and is based on diaphragm extrusion, particularly for a Larox®-type vertical pressure filter. The filtering properties of the filter cloth (5) are substantially similar in both directions through the cloth since slurry containing liquid and solids is alternately placed on the different sides of the filter cloth. The filter cloth of the invention comprises a middle layer (15) and protective layers (16a, 16b; 17a, 17b) provided on both outer surfaces of the middle layer. The middle layer can have e.g. a woven structure, and the protective layers may be batt fiber layers attached to the middle layer by needling. According to a preferred embodiment of the invention, the protective layers according to the invention are denser than the middle layer.

3 Claims, 4 Drawing Sheets

FILTER CLOTH

REFERENCE TO RELATED APPLICATION

Figure 1A:
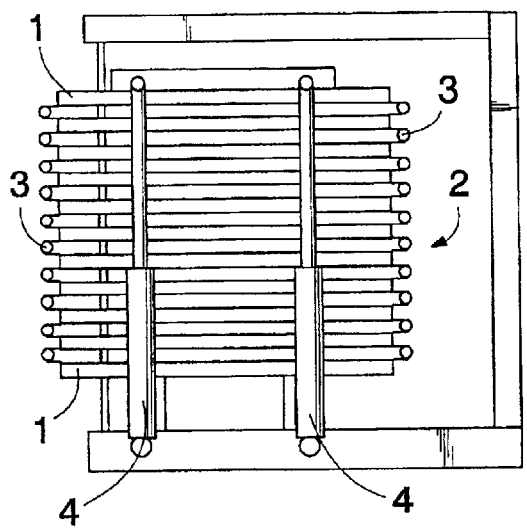

This Application is a continuation of International Appilication No. PCT/FI00/00105, whose international filing date is Feb. 14, 2000, which in turn claims the benefit of FINLAND Application No. 990334, filed Feb. 17, 1999, the disclosures of which Applications are incorporated by reference herein. The benefit of the filing and priority dates of the International and FINLAND Applications is respectfully requested.

The invention relates to a filter cloth intended for use in a pressure filter based on diaphragm extrusion which comprises at least two filter chambers and in which the filter cloth is guided through the filter chambers arranged one after the other in the direction of movement of the cloth so that in the filter chambers, the opposite sides of the filter cloth are alternately against the slurry to be filtered which contains liquid and solids, the filter cloth being symmetrical in respect of the filtering ability, and the solids separated from the slurry in said filter are conveyed out of the filter chamber by means of the filter cloth.

Removal of liquid, i.e. solid/liquid separation, is needed in the mining industry, metal processing, chemical industry and in preparation processes of foodstuffs and pharmaceuticals, for instance. For this purpose there are various filtering apparatuses the operating principles and properties of which differ from one another. One known filter type used in the treatment of slurry consisting of liquid and solids is a vertical chamber filter which has a variable volume and utilizes diaphragm extrusion. A pressure filter known by the product name Larox® also works on this principle. The operation and structure of this filter will be described below in FIGS. 1 to 3f. The filter comprises several superimposed horizontal filter plates which define filter chambers. A filter cloth is arranged to travel through the openable and closable filter plates of each chamber. The slurry to be filtered is fed into the chambers to the other side of the filter cloth, after which it is pressed against the filter cloth by means of an expanding elastic diaphragm. In that case the liquid in the slurry is squeezed through the cloth and the solids remain on the other side of the cloth, forming a 'cake'. After compression and the other phases the pack formed by the filter plates is opened and the filter cloth is moved with respect to the filter chambers to remove the solids from the chambers. The filter cloth travels, guided by suitable turning rolls or the like, from one of the superimposed chambers to another, and thus the slurry is alternately placed on the different sides of the filter cloth in the filter chambers arranged one after the other in the direction of movement of the cloth. Consequently, the filter cloth needs to be symmetrical in respect of its filtering ability to provide filtrate of equal quality from each filter chamber.

The requirements set for the properties of the filter cloths intended for the above-mentioned use are high. Not only do they function as the filtering medium, but also as a conveyor belt when conveying the solids cake during the discharge phase of the filtration process out of the filter chambers. In the largest filters the solids separated during one phase and conveyed by the filter cloth may weigh even 20 000 kilos. Particularly in the discharge phase the filter cloth is thus subjected to a high tensile stress. Furthermore, during use scrapers and washing devices, for example, subject the filter cloth to considerable wear. The conditions in which the cloths must operate are also demanding, i.e. in addition to mechanical stress the cloths are subjected to high temperatures, temperature changes, high pressure and varying pH conditions, for example. The filter cloths need to be replaced from time to time not only because of wear and tear, but also because of a decreased filtering ability resulting from clogging and dirtying. As regards the use of the filtering apparatuses, it would be advantageous if the useful life of the filter cloth could be increased because replacement of the cloth causes considerable costs and production breakdowns.

The object of the present invention is to provide a novel filter cloth which eliminates problems associated with the prior art solutions.

The filter cloth of the invention is characterized in that it comprises a middle layer both surfaces of which are provided with protective layers which form the outer surfaces of the filter clothr.

The basic idea of the invention is that the filter cloth intended for use in a pressure filter based on diaphragm extrusion comprises at least three layers attached to one another. In that case both outer surfaces of the filter cloth are provided with separate protective layers. The protective layers are formed so that the filter cloth is at least functionally symmetrical, i.e. its fitering ability and other operating characteristics are substantially similar on both sides of the cloth. The basic idea of a preferred embodiment of the invention is that the protective layers are made to resist wear by using wear-resistant fibres or threads and bond structures between them. Thus the protective layers function as wear surfaces which effectively protect the middle layer of the filter cloth. The basic idea of another preferred embodiment of the invention is that the protective layers are denser than the middle layer, thus functioning as the actual filtering layers of the cloth.

An advantage of the invention is that the useful life of the filter cloth can be increased compared to the prior art cloths. Thanks to the longer useful life, replacement of the filter cloth will cause fewer breaks in production and the other costs related to the replacement will also be lower. A further advantage is that in addition to durability and density, the other filtering and operating characteristics of the cloth can be influenced by the selection and dimensioning of the protective layers, if necessary. According to an embodiment of the invention, the quality of the resulting filtrates can be improved by means of a filter cloth which is denser than the cloths used at the moment. The dense filter cloth is also easier to wash and clean since the dirt is not absorbed into the cloth as easily as before. Thanks to the multilayer structure, the middle layer of the filter cloth can be made looser than before, and thus the required density of the cloth is provided by means of the protective layers.

Figure 1B:
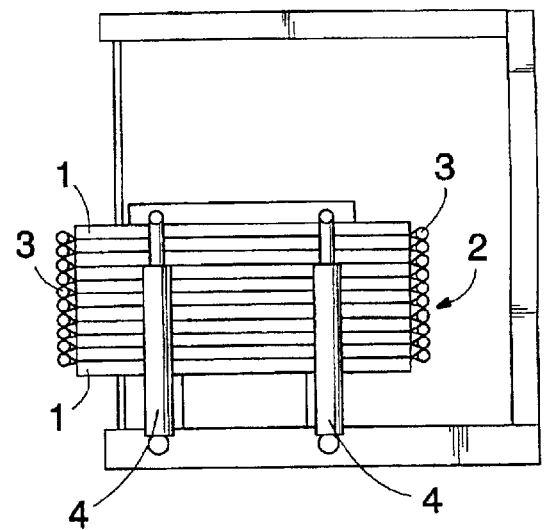
Figure 2A:
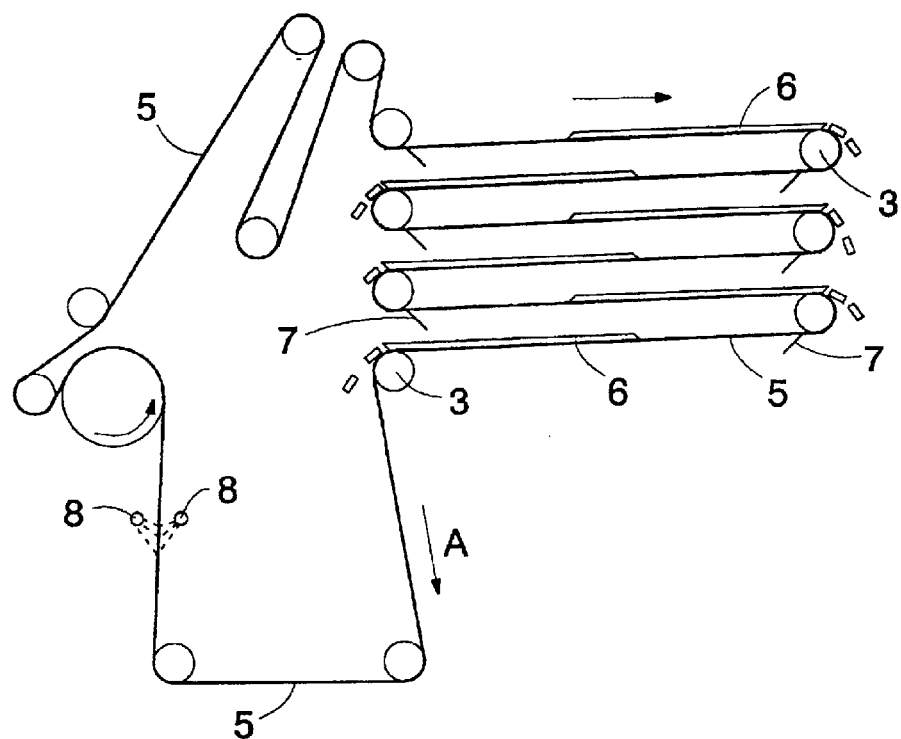
Figure 3F:
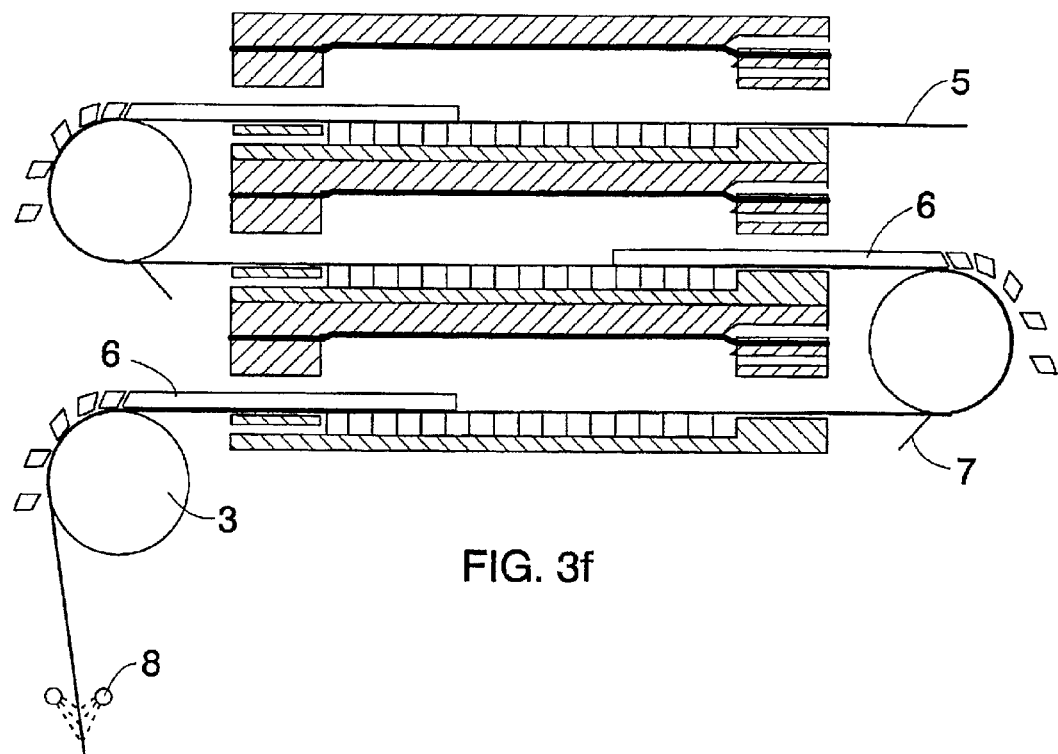
Figure 2B:
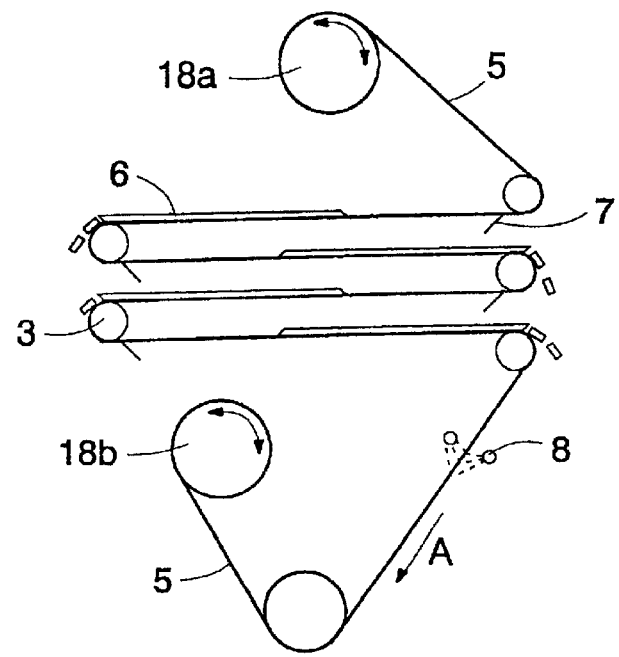
Figure 3A:
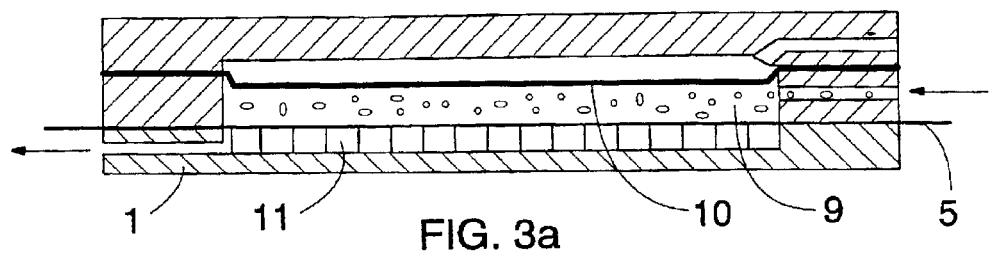
Figure 3B:
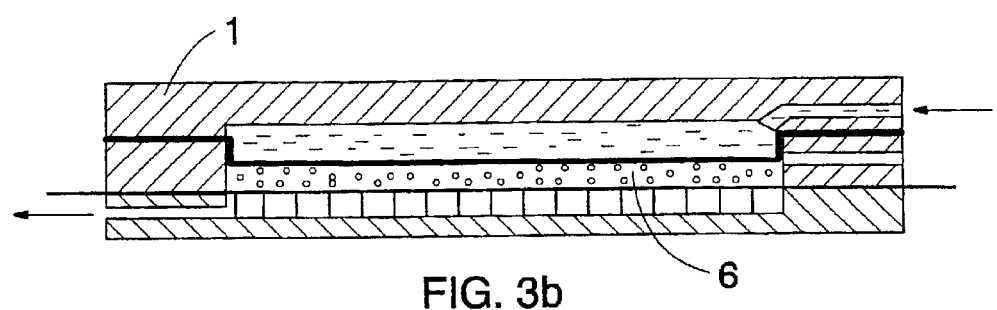
Figure 3C:
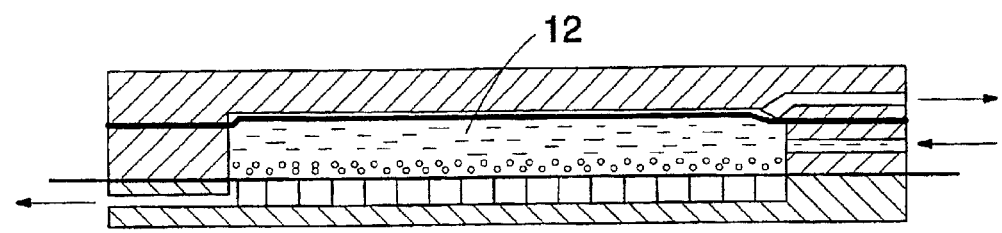
Figure 3D:
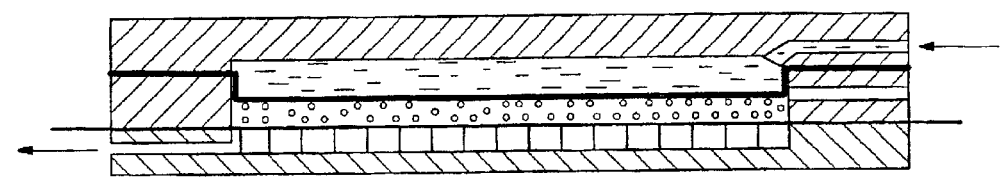
Figure 3E:
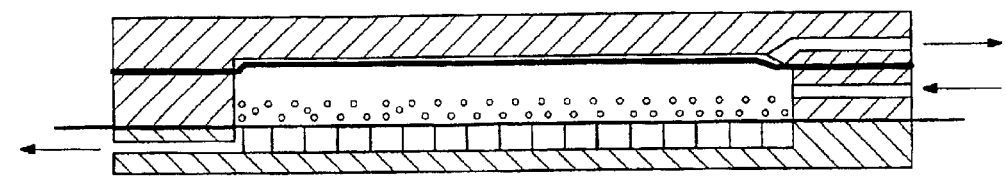
Figure 4:
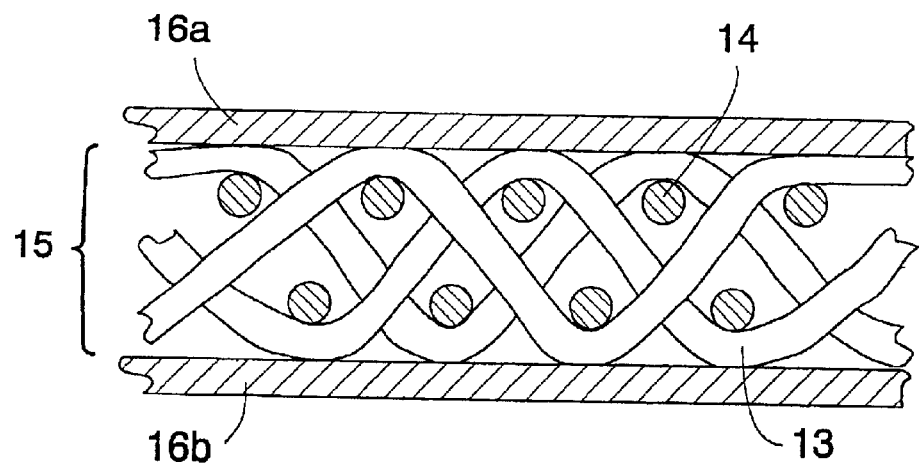
Figure 5:
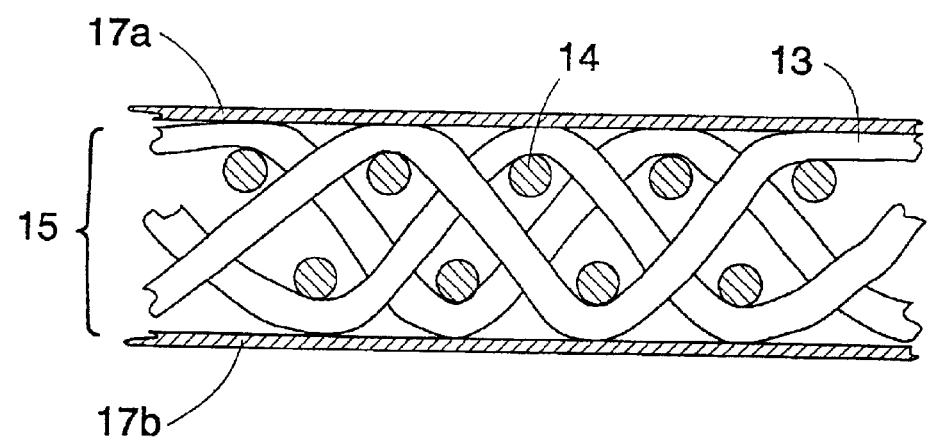

The invention will be described in greater detail in the attached drawings, in which FIGS. 1a and 1b are schematic side views of the structure of a vertical pressure filter apparatus where a filter cloth according to the invention can be used, FIG. 2a schematically illustrates how a filter cloth according to the invention travels in the filtering apparatus of the previous figure, and FIG. 2b illustrates the same in another fitering apparatus, FIGS. 3a to 3f schematically illustrate the operating principle of a filtering apparatus illustrated in FIGS. 1a to 2a, FIG. 4 is an enlargement of the cross-sectional structure of a filter cloth according to the invention, and FIG. 5 is an enlargement of the cross-sectional structure of a filter cloth according to the invention.

FIGS. 1a and 1b are considerably simplified side views of the structure of a Larox®-type pressure filter. The filter comprises several horizontally arranged filter plates 1 which form a plate pack 2 comprising superimposed filter chambers. The filter cloth has the shape of an endless loop and is arranged to travel, guided by turning rolls 3 or the like, between the superimposed filter plates from one chamber to another in the direction of movement of the cloth. FIG. 2a illustrates in greater detail how the filter cloth travels in the filtering apparatus. The fitering apparatus further comprises closing means, such as hydraulic cylinders 4, a screw mechanism or the like for pressing the filter plates of the pack against each other. In FIG. 1a the filter is open, i.e. in the discharge position in which the filter cloth can be moved. In FIG. 1b the filter is in the closed position during which the other phases of the filtering process occur as shown in FIGS. 3a to 3e.

FIG. 2a illustrates in a simplified manner how the filter cloth 5 travels in a filter according to the previous figures. The filter cloth is guided through filter chambers (not shown) between the filter plates by means of turning rolls 3. The apparatus also comprises necessary rolls or other guiding members for adjusting the tenseness and lateral position of the filter cloth, and a roll which moves the filter cloth. In the situation shown in the figure the plate pack is open, in which case a solids cake 6 is removed from the filter chambers by moving the filter cloth 5 in direction A. The material stuck on the filter cloth can be removed using scrapers 7 or the like provided for each turning roll. The filter further comprises a washing apparatus 8 for washing the filter cloth.

FIG. 2b illustrates how the filter cloth 5 according to the invention travels in another vertical pressure filter. The phases of the filter cycle may be the same as those illustrated in FIGS. 3a to 3f. The solution differs from the solution of FIG. 2a in that the filter cloth does not have the shape of a dosed loop, but the filter cloth runs through the filter from the first roll 18a to the second roll 18b. The filter cloth 5 can be moved in the direction opposite to direction A shown in the figure to lead the cloth back to roll 18a.

FIGS. 3a to 3f are simplified schematic views of the phases of the filter cycle according to the previous figures in one chamber. The different filtering phases occur simultaneously in all different chambers of the filter. In FIG. 3a the slurry 9 to be filtered is fed into the filter chamber between a pressing diaphragm 10 and a filter cloth 5. Due to gravitation and feeding pressure of the slurry the liquid included in the slurry starts to penetrate through the filter cloth into a space 11 on the other side of the cloth from which it is supplied forward by means of suitable channels. A layer of moist solids begins to build up on the upper surface of the filter cloth 5. FIG. 3b illustrates the compression phase in which pressure, e.g. pressurized air or water, is supplied above the elastic diaphragm, and consequently the diaphragm 10 presses the solids cake 6 against the filter cloth, thus making the liquid included in it to move to the other side of the cloth. FIGS. 3c and 3d illustrate phases which are related to washing the cake and may be in use in the apparatus. In the washing phase illustrated in FIG. 3c, washing liquid 12 is fed between the diaphragm and the solids cake and the liquid pushes the diaphragm into its upper position and penetrates the cake, simultaneously washing it. In the second compression phase the washing liquid contained in the chamber and solids are pressed through the filter cloth and out of the filter chamber by means of the diaphragm. The solids cake is finally dried by blowing pressurized air through it as shown in FIG. 3e. After this, the plate pack is opened and the filter cloth is moved forwards in its direction of movement, in which case the dry cake 6 formed on the surface of the cloth can be led out of the filter chamber. The cloth is also washed. The discharge phase is illustrated in FIG. 3f. After this, the phases described above are repeated simultaneously in all filter chambers.

FIG. 4 is a simplified cross-sectional view of an application of the filter cloth according to the invention. The filter cloth comprises a middle layer 15 woven of machine-direction warp threads 13 and transverse weft threads 14. Some bonds known per se and suitable threads or thread materials can be used for weaving the middle layer of the cloth. Thus currently used woven filter cloths are well suited for the middle layer, but it could be made of non-woven fabrics, too. The threads typically used for filter cloths are multi-filament threads made of some of the following plastic materials, for example: polyethylene terephthalate (PET), polypropene (PP), polyamide (PA), polyphenylene sulphide (PPS) or polyetheretherketone (PEEK). As is seen in the figure, both sides of the woven middle layer 15 are provided with symmetrical protective layers 16a and 16b which form the outer surfaces of the filter cloth to be arranged against the slurry to be filtered. Protective layers made separately of the middle layer, such as batt fibre layers or layers made of staple fibres e.g. by compression, can be attached to the middle layer e.g. by needling, but other attachment methods known in the field, such as gluing and melting bonds, may also be used, depending on the structure of the protective layers. In the structure illustrated in the figure, the primary purpose of the protective layers is not to affect the density of the filter cloth, but to protect the middle layer. Protective layers which are looser than the middle layer are preferably made of threads or fibres having good wear-resistance using bonds or attachment methods with good wear-resistance. The protective layers receive the strain to which the filter cloth surfaces are subjected during the compression and discharge of the cake and by the doctoring and washing of the filter cloth. The fact that the protective layers, which are clearly looser than the middle layer, wear in use does not substantially affect the filtering ability of the filter cloth. The protective layers can also be made to receive part of the tensile strain directed to the filter cloth, in which case the middle layer can be made of a fabric which is less resistant to tensile strain, provided that this is advantageous to the filtering ability. It should be mentioned that the thickness of the protective layers and that of the middle layer can be adjusted according to the need. Furthermore, the protective layers on both sides of the middle layer of the cloth may consist of more than one layer, provided that they are arranged so that the filtering ability of the filter cloth is independent of the fact on which side of the cloth the material to be filtered is placed. It is advantageous to manufacture a cloth with a symmetric structure where both sides of the middle layer are provided with the same number of similar protective layers. In addition, a multilayer filter has a kind of sandwich structure which provides the filter cloth with better transverse rigidity, if necessary. It is advantageous to make both the middle layer and the protective layers easily cleanable e.g. by using soil-repellent fibres or fibres treated to be soil-repellent.

FIG. 5 is a cross-sectional view of the structure of a filter cloth according to the invention. The same fabric as in the solution according to the previous figure can be used in the middle layer 15. Here the outer surfaces of the middle layer are provided with protective layers 17a and 17b which are denser than the middle layer 15. In that case the protective layers do not only function as the outermost surface receiving the mechanical stress, but also as layers affecting the actual filtering process. Since the desired density of the cloth is adjusted by means of the protective layers, the structure of the middle layer is not relevant to the filtering ability. The middle layer is mainly a base to which the protective layers are attached and provides the cloth with the necessary tensile strength so that it can function as the conveyor belt in the manner required by the filtering apparatus. In that case it is possible to use a standard middle layer which is mechanically strong and the surfaces of which are provided with different protective layers according to the properties to be achieved.

Since rather a high pressure is used in pressure filtering apparatuses, the filter cloths used are relatively dense compared to the filter cloths used in other filtering apparatuses. Nowadays the air permeance of the filter cloths is within the range of 0.3 to 15 $m^3/m^2$ min, 200 Pa, depending on the filtering quality needed and the slurry to be filtered. A single-layer woven filter cloth, which is suitable for the purpose, can be provided with the minimum permeance of 0.2 $m^3/m^2$ min, 200 Pa by calendering. The density of the multilayer cloth according to the invention can be below 0.2, preferably between 0.02 to 0.15 $m^3/m^2$ min, 200 Pa. According to the prevalent opinion in the field, filter cloths as dense as that cannot be used in pressure filters. In the tests carried out a filter cloth with the permeance of 0.03 $m^3/m^2$ min, 200 Pa, which is only about a tenth of the permeance of the currently used cloths, was found to function well. However, the test runs carried out with the cloth of the invention, which is denser than the prior art cloths, showed that, contrary to the preconceptions, it functions particularly well and the resulting filtrate is clearly cleaner than before and the solids cake drier. Surprisingly, it was also noted that the useful life of the cloth had increased even by several times compared to the previously used filter cloths. The latter results from the fact that particles of the slurry to be treated cannot penetrate through the small holes in the filter cloth into the inner structure of the cloth, but the solids remain on the surface of the cloth from which they can be removed properly by means of scrapers and washing devices. Thanks to the high pressure, the denser filter cloth does not substantially reduce the filtering ability.

It is also possible to influence the dewatering properties of the filter cloth and its cleanliness and cleanability by adjusting the hydrophobicity and/or hydrophilicity of the different layers of the filter cloth in the desired manner. In this way the protective layers, for example, can be treated to be soil-repellent.

As was mentioned above, the protective layers may consist of batt fibre layers which are attached to the middle layer e.g. by needling. The protective layer of the invention can also be provided by attaching a woven layer, porous permeable coating material or an appropriately perforated diaphragm to the outer surface of the middle layer. The materials used in the protective layers include polyethylene terephthalate (PET), polyethylene (PE), polyamide (PA) and polytetrafluoroethylene (PTFE). The protective layers can also be attached to the middle layer by welding, e.g. by ultrasonic welding.

The drawings and the related description are only intended to illustrate the inventive concept. The details of the invention may vary within the scope of the claims. Thus the invention is not limited only to the filters illustrated in FIGS. 1a to 2b, but it can also be applied to other similar pressure filters where the filter cloth is arranged to travel through filter chambers arranged one after the other in the direction of the filter cloth so that the mass or slurry to be filtered is alternately placed on the different sides of the filter cloth in successive filter chambers.

What is claimed is:

1. A solid-liquid filtration filter cloth which is intended for use in a pressure filter based on diaphragm extrusion which comprises at least two filter chambers and in which the filter cloth is guided through the filter chambers arranged one after the other in the direction of movement of the filter cloth so that in the filter chambers, the opposite sides of the filter cloth are alternately against the slurry to be filtered which contains liquid and solids, the filter cloth being symmetrical in respect of the filtering ability, the filter cloth comprises a middle layer the both surfaces of which are provided with protective layers which form the outer surfaces of the filter cloth and are denser than the middle layer, the protective layers are batt fibre layers attached to the middle layer by needling, the middle layer has a woven structure comprising machine direction threads and transverse threads and withstanding tensile stress thus allowing the solids separated from the slurry in said filter to be conveyed out of the filter chambers by means of the filter cloth.

2. A filter cloth according to claim 1, wherein the protective layers are made to resist wear by using wear-resistant fibres.

3. A filter cloth according to claim 1, wherein the air permeance of the filter cloth is below 0.2 $m^3/m^2$ min, 200 Pa.

* * * * *